United States Patent Office

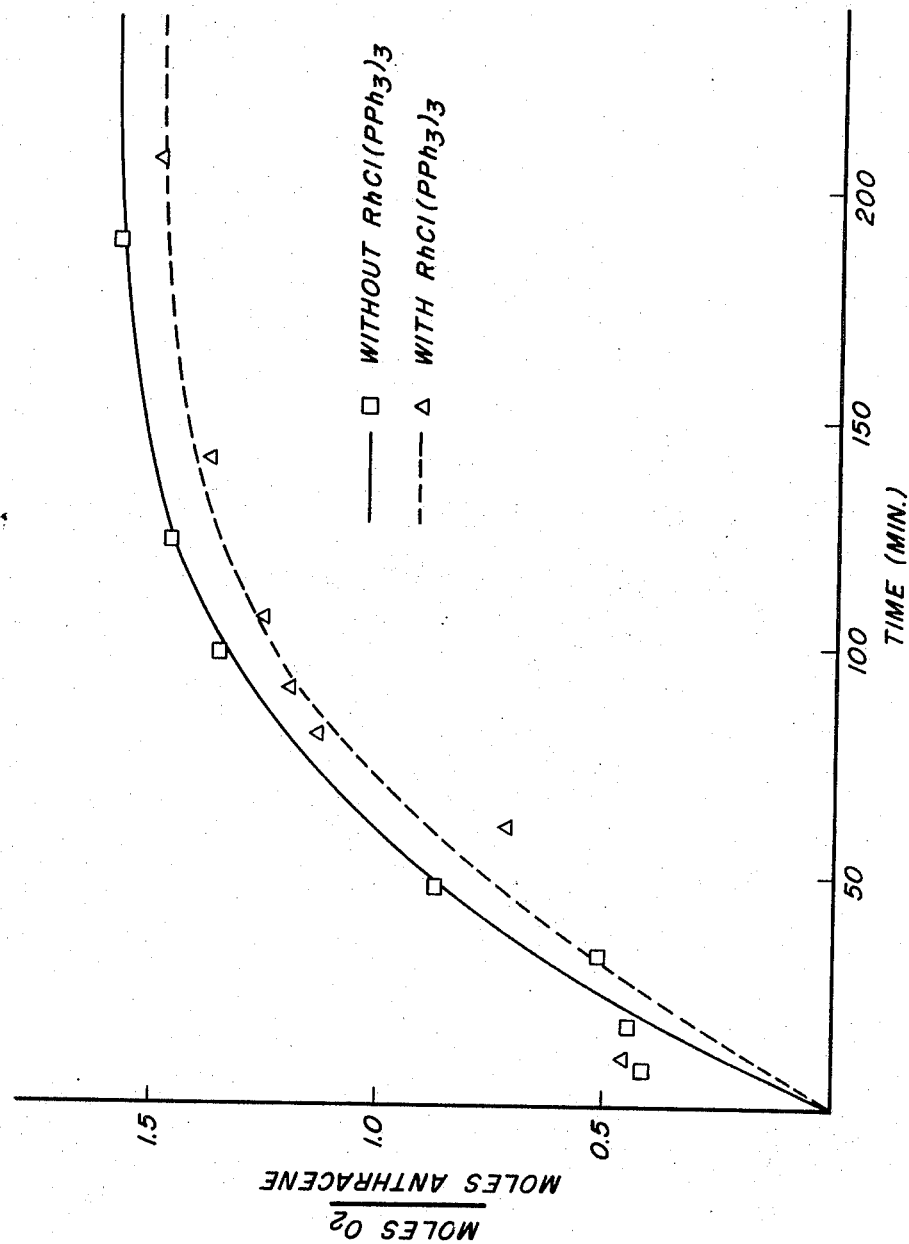

3,642,838
Patented Feb. 15, 1972

3,642,838
UNCATALYZED OXIDATION OF ANTHRACENE TO 9,10-ANTHRAQUINONE BY MOLECULAR OXYGEN
Fausto Calderazzo, Pescia, Italy, assignor to American Cyanamid Company, Stamford, Conn.
Filed Apr. 30, 1969, Ser. No. 820,514
Int. Cl. C07c *49/68*
U.S. Cl. 260—385
6 Claims

ABSTRACT OF THE DISCLOSURE

Anthracene is oxidized to anthraquinone by molecular oxygen in a medium of acetone, or acetic acid, or acetic anhydride, or mixtures of the acid and anhydride. The oxygen is under pressure, for example 70 to 100 atmospheres, and the temperature is elevated, preferably between 70° and 105° C. No oxidation catalyst is needed.

BACKGROUND OF THE INVENTION

Anthraquinone, which is an important raw material for vat dyes, is prepared in large tonnages in general by two processes. One involves the reaction of phthalic anhydride and benzene by a Friedel-Crafts reaction to form benzoylbenzoic acid which is then ring closed to form the anthraquinone. This process involves several steps and hence is expensive. The other process, which has been used primarily in Europe, is a vapor phase catalytic oxidation of anthracene. This process requires, first of all, a catalyst and, secondly, quite pure anthracene. This latter requirement presents a considerable problem because crude anthracene is recovered from coal tar distillation in a mixture with phenanthrene and carbazol. Even the best method of purification, which involves the use of furfural as a solvent, represents quite a costly operation.

It has also been proposed to oxidize anthracene with molecular oxygen in the liquid phase in the presence of catalysts or of oxygen carriers such as, for example, nitrites or oxides of nitrogen. In general these processes have not proved as economical as those starting with phthalic anhydride or the vapor phase catalytic oxidation of anthracene.

SUMMARY OF THE INVENTION

In the present invention anthracene is oxidized with molecular oxygen at elevated temperatures and pressures in a medium of glacial acetic acid, or acetic anhydride, or a mixture of acetic acid and acetic anhydride or of acetone. No catalyst is needed as the reaction proceeds just as well without any catalyst as it does with an oxidation catalyst such as the well known tris (triphenylphosphine) rhodium chloride. Pressure drop measurements have shown that oxygen was absorbed at substantially equal rates with or without the rhodium catalyst. This eliminates the cost of the catalyst and the problems of separating and recovering it. It was also known that the reaction is not activated by the metal walls of the autoclave, as good yields of anthraquinone were obtained in a quartz vessel.

Another important advantage of the present invention is that the anthracene does not have to be chemically pure and the high degree of purity which is essential for vapor phase catalysis is not necessary. Therefore the expensive, thorough purification can be reduced or eliminated to a large extent. This is not to say that some preliminary concentration of the anthracene is not useful because in many cases in crude anthracene the anthracene content is quite small. There is often considerably more phenanthrene than anthracene, and therefore some degree of concentration is often worthwhile. However, it is a great advantage of the present invention that the reaction conditions do not result in any significant oxidation of phenanthrene to phenanthrenequinone.

While there can be extensive amounts of phenanthrene present without adversely affecting the reaction, it is desirable to remove a large portion of the carbazol. This is not an economic disadvantage because this can be done easily with potassium to form potassium carbazol and since this product is useful in the dye stuff industry, the cost of concentrating crude anthracene by removing substantial amounts of carbazol is usually not serious. When the very efficient concentration using furfural is employed, the anthracene can be concentrated both with respect to carbazol and to phenanthrene. However, even here the fact that it is not necessary to carry out a concentration to produce practically pure anthracene represents a valuable economic advantage.

Another advantage of the present invention is that the proportions of reactants are in no sense critical, although in general the acetic acid and acetic anhydride or acetone are preferably in substantial excess over the anthracene. However, amounts of acetic acid and acetic anhydride or of acetone only five to eight times the amount of anthracene are useful. Excesses of as much as twelve times the amount of anthracene usually give better yields. Separation of anthraquinone from the reaction mixture presents no particularly serious problem even when acetic acid or acetic anhydride are used. Anthraquinone can be recovered from the reaction mixture by filtration and the solvent reused. Also, the elimination of water by acetic anhydride formed during the reaction is not critical since equally good results are obtained in acetic acid alone. It is also of considerable practical importance that the less expensive acetone can be used as the reaction solvent and a pure product crystallizes out directly. In less polar solvents, such as benzene, no oxidation of anthracene takes place.

While the acetic acid or acetic acid—acetic anhydride mixture is preferred, corresponding acids and anhydrides, such as propionic acid and anhydride, may be used. However, it is not a question merely of an inert solvent because when an inert solvent such as benzene is used there is practically no oxidation of the anthracene. The acetic acid and acetic anhydride therefore do not behave purely as inert solvents or reaction diluents but do actually affect the efficiency of the process. Ketones in which water is at least partially miscible are useful; acetone, which is completely miscible with water, is an example.

Oxygen should be in excess but need not be in great excess.

Under the conditions specified in the following examples, the reaction usually takes 3 to 7 hours to go to completion. This is indicated by pressure drop measurements of the oxygen absorbed. Longer reaction times were employed to ascertain the substantial absence of by-products.

BRIEF DESCRIPTION OF THE DRAWINGS

The drawings show comparison graphs.

DESCRIPTION OF THE PREFERRED EMBODIMENTS

The invention will be illustrated by some typical examples, including comparison examples with and without catalyst and with solvents such as benzene. The parts are by weight unless otherwise specified.

Example 1

In a stainless steel autoclave of 754 ml. capacity, 20 g. of anthracene (Fluka purum) were introduced together with 250 ml. of glacial acetic acid and 100 g. of acetic anhydride. Oxygen was introduced and compressed to 80 atm. at room temperature. Under magnetic stirring the autoclave was heated gradually (about 1 hr. 45 min.) to 70° C. At this temperature oxygen absorption began and practically stopped after 3 hrs., while the temperature slowly increased to 100° C. The reaction conditions were maintained overnight but no further oxygen absorption was observed. The anthaquinone formed was removed from the reaction mixture by filtration after the mixture was cooled, preferably with the addition of a small amount of water to the filtrate, which reduces the solubility of the anthraquinone. A crude yield of about 97% was obtained. Analytically and spectroscopically pure anthraquinone was obtained by recrystallizing the product from acetophenone or chloroform.

Example 2

The procedure of Example 1 was repeated with about 0.74 g. of the well known oxidation catalyst tris(triphenylphosphine) rhodium chloride. The temperature reached 90° to 100° C. A yield of somewhat over 91% was obtained. Thus the catalyst did not provide an increased yield.

Example 3

The procedure of Example 2 was repeated substituting 250 ml. of benzene for the acetic acid-acetic anhydride mixture. No reaction took place, as evidenced by lack of absorption of oxygen or formation of anthraquinone.

Example 4

Example 1 was repeated but instead of using a mixture of acetic acid and acetic anhydride, 350 ml. of acetic acid with used. The reaction was continued for 48 hrs. and a yield of about 75% obtained.

Example 5

Anthracene (20.0 g., 0.1122 moles) was introduced in a 754 ml. capacity stainless steel autoclave together with 350 ml. acetone and oxygen was then compressed to 80 atm. at room temperature. The rocking autoclave was heated at 104° C. for 7 hrs. After cooling, the content of the autoclave was filtered and the yellow crystalline product (17.6 g., 75.3% yield) was found to be pure 9,10-anthraquinone and to have an infrared spectrum superimposable on that of the commercially available pure grade material. As a result the product requires no further treatment.

Example 6

The procedure of Example 1 was repeated using 3 g. of anthracene and 25 ml. of acetic acid and 15 ml. of acetic anhydride in a quartz tube, thus keeping the solution out of contact with the metal walls of the autoclave. The temperature was 104° C. and the reaction was maintained for 17 hrs. The yield was approximately 83%.

In Examples 1 to 5 the anthracene used was not completely pure but contained some phenanthrene. When chemically pure anthracene was used it did not significantly increase the yields based on the anthracene. The phenanthrene was not significantly oxidized in the Examples 1 to 5.

Example 7

Parallel experiments were carried out under the conditions of Examples 1 and 2 (i.e., without catalyst and with catalyst), and the absorption of oxygen versus time was noted. In both cases the oxygen absorption rose to about the theoretical amount (1.5 moles per mole of anthracene) in 3 to 4 hrs. and did not significantly increase thereafter. The catalyst did not significantly affect the course of reaction or yield as is shown by the graph in the drawing. This is quite surprising, but the exact reason is not known and the invention is not limited to any particular theory.

I claim:
1. A process for the production of anthraquinone which comprises reacting anthracene with molecular oxygen under pressure from 70 to 100 atmospheres and at elevated temperatures from about 70° to about 105° C. in an excess of a medium selected from the group consisting of acetone, acetic acid, acetic anhydride and mixtures of acetic acid and acetic anhydride, the reaction taking place in the absence of any added oxidation catalyst or oxides of nitrogen.
2. A process according to claim 1 in which the anthracene contains phenanthrene.
3. A process according to claim 1 in which the reaction is carried out in acetic acid without substantial amounts of acetic anhydride.
4. A process according to claim 1 in which the reaction is carried out in an excess of acetic acid without substantial amounts of acetic anhydride.
5. A process according to claim 1 in which the medium is acetone.
6. A process according to claim 2 in which the medium is acetone.

References Cited
FOREIGN PATENTS

| 5,514 | 1915 | Great Britain | 260—385 |
| 406,777 | 1924 | Germany | 260—57 |

LORRAINE A. WEINBERGER, Primary Examiner

R. GERSTL, Assistant Examiner